United States Patent [19]

Sallis

[11] Patent Number: 4,620,382
[45] Date of Patent: Nov. 4, 1986

[54] APPARATUS FOR TENSIONING A HELIOSTAT MEMBRANE

[76] Inventor: Daniel V. Sallis, P.O. Box 554, Littleton, Colo. 80120

[21] Appl. No.: 617,820

[22] Filed: Jun. 6, 1984

[51] Int. Cl.$^4$ ............................ D06C 3/08; F24J 3/02
[52] U.S. Cl. .................. 38/102.2; 38/102.91; 126/438; 160/354; 264/291
[58] Field of Search ............ 126/438, 439; 69/19, 69/19.1, 19.2, 19.3; 38/102, 102.1, 102.2, 102.91; 26/80, 85; 160/354, 378, 380DIG. 15; 264/291, 292; 223/67; 138/93

[56] References Cited

U.S. PATENT DOCUMENTS

| | | | |
|---|---|---|---|
| 1,701,472 | 2/1929 | Dinsmore | 264/291 |
| 2,496,460 | 2/1950 | Evans | 441/40 |
| 2,779,053 | 1/1957 | Longstreth et al. | 38/102 X |
| 2,883,676 | 4/1959 | Kwake | 160/354 |
| 3,243,042 | 3/1966 | Moulton | 160/380 X |
| 3,273,497 | 9/1966 | Rosema et al. | 160/378 X |
| 3,407,634 | 10/1968 | Nelson | 69/19.1 |
| 4,358,183 | 11/1982 | Whiteford | 126/438 X |
| 4,441,267 | 4/1984 | Doss | 38/102.91 X |
| 4,483,323 | 11/1984 | Murphy | 126/438 |
| 4,487,196 | 12/1984 | Murphy | 126/438 |

OTHER PUBLICATIONS

Bike Nash Bar 1984 Parts & Accessories Catalog, pp. 29-31.
U.S. Dept. of Energy, Record of Invention, 1982, Contract No. IP-2-02060.

Primary Examiner—Werner H. Schroeder
Assistant Examiner—Andrew M. Falik
Attorney, Agent, or Firm—Charles C. Corbin

[57] ABSTRACT

An apparatus for pneumatically or hydraulically tensioning a membrane, which stretched membrane can support a reflective surface for use as a heliostat in a solar energy collection system.

11 Claims, 7 Drawing Figures

APPARATUS FOR TENSIONING A HELIOSTAT MEMBRANE

It is noted that this invention was made with government support under DOE Contract No.: EG-77-C-01-4042, SERI Sub IP-2-02060.

BACKGROUND

This invention relates to apparatus for tensioning a membrane of sheet material over a support frame, the stretched membrane being used to support a solar reflecting surface. In the manufacture of heliostats that use a taut membrane held over a support frame it is necessary to generate and maintain a uniform tensioning force in the membrane so as to provide a smooth planar surface for high efficiency solar refelction. Problems initially arise with respect to how to pull the membrane to the high tension levels which can be in the 50 to 100 pounds per inch range. Conventional methods of installing a tensioned membrane over a support frame required either the membrane alone or the frame alone being loaded during the attachment of membrane to frame. This necessitated the loaded element to be overloaded to achieve the desired final tension. To achieve these extra high loads required investment in a substantial structural fixture. Another area of concern lies with maintaining the stretched membrane at the desirable level of tension. For example, rivets and screws have a significant slippage and will relieve a large portion of the preload, bond materials may creep with time, and welding is difficult since the material is under load. In addition, ambient temperature changes will cause significant tension changes in the membrane, particularly when materials with different coefficients of expansion are used in support frame and membrane.

SUMMARY OF THE INVENTION

In view of the foregoing it is an object of the present invention to provide an apparatus for tensioning a membrane which does so by preloading the membrane and its support frame simultaneously.

Another object of the invention to provide a solar reflector having the capability to vary the tensioning forces in the reflective surface supporting membrane as necessary so as to maintain the membrane at the most desirable tension load. It is a further object of the invention to provide a membrane tensioning apparatus that avoids the buildup of non-uniform strain in the membrane so as to achieve a uniformly loaded, smooth planar surface.

Other and further objectives of the invention will become apparent upon referring to the brief summary below, the detailed description thereafter following and the drawings annexed hereto.

Accordingly, the present invention provides an apparatus for tensioning a membrane over a support frame while simultaneously loading both support frame and membrane. The support frame which defines a closed loop in planform is preferably circular but may have other radially symetrical configurations. The membrane engages the upper edge of the frame, and there is a plurality of means located around the frame periphery for attaching to the outermost circumferential portion of the membrane and passing around the outer side of the frame for attachment to the region of the lower edge of the frame. A fluid-inflatable bladder is interposed between the outer side of the frame and the inner side of the aforedescribed attaching means, whereby pressurization of the bladder will simultaneously induce compressive forces on the frame and the uniform tensioning forces in the membrane.

In one embodiment of the invention there is a plurality of clamps located around the periphery of the frame which have upper portions which clamp the outer peripheral portion of the membrane, and lower portions that pivotally engage the lower portion of the frame. A fluid inflatable bladder is interposed between the clamps and the outer wall of the support frame.

In another embodiment of the invention the outer peripheral portion of the membrane comprises a plurality of integral, radially extending tabs which wrap around the bladder and attach to the underside of the frame.

In still another embodiment of the invention, fabric material is attached to the periphery of the membrane and wraps around the bladder and is affixed to the underside of the frame.

Still further embodiments are disclosed in the ensuing detailed description.

DETAILED DESCRIPTION OF THE DRAWINGS

Figure 1:
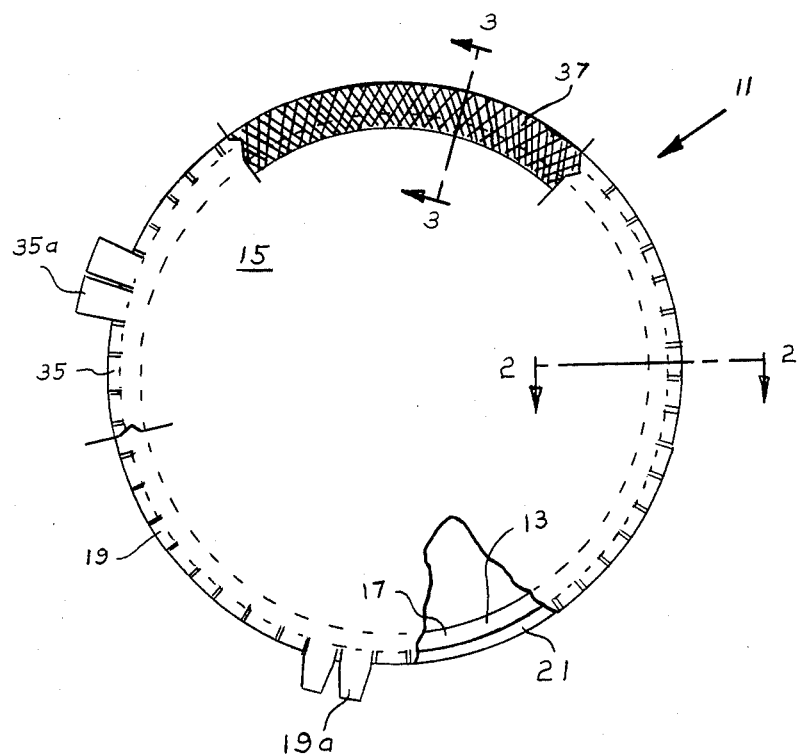
FIG. 1 is a partially broken plan view of the invention with the radially outer portion divided to show embodiments of the invention having a woven fabric edge, a membrane edge comprising tabs that form pleats, and an edge having tabs that do not overlap.
Figure 2:
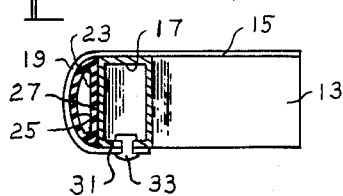
FIG. 2 is an enlarged sectional view taken along line 2—2 of FIG. 1.

FIG. 1 shows a taut membrane heliostat 11 that includes a steel support frame 13. For a single membrane configuration such as shown in FIGS. 1 through 4 the frame 13 must possess a significant torsional stiffness which essentially dictates a closed cross-section such as a tube. The preferred cross-section for the single membrane configuratin is a rectangular tube, for which the height, width and thickness can be selected to provide the required torsional stiffness and out-of-plane bending stiffness. A circular frame 13 is preferred since it is the most efficient structure for loading. A circular membrane 15 comprising thin sheet (0.012 in.) steel is located with a lower peripheral portion engaging the upper surface 17 of the support frame 13. The most efficient membrane material is one with the highest strength to weight ratio that can be obtained in the 0.005 in. to 0.012 in. thickness range. In one embodiment of the invention shown in FIG. 1 the portion of the membrane 15 which extends radially beyond the outer edge of the frame 13 is cut into a plurality of integral, radially extending tabs 19. A bladder 21, preferably constructed of an elastomer such as Butyl rubber and which encircles the support frame 13, has an inner wall 23 as shown in FIG. 2 which lies in engagement with outer wall 27 of frame 13, and an outer wall 25. In the preferred embodiment, bladder 21 is connected to an air compressor of conventional design, with associated gages and valves.

Each tab 19 curves around and embraces the outer bladder wall 25 as shown in FIG. 2, and is firmly affixed to the lower support frame wall 31 by rivets 33. Prior to attachment tabs 19 are cut and trimmed into the radially extended general configuration illustrated by tabs 19a. Trimming ensures that tabs 19 do not touch one another.

In another embodiment of the invention also shown in FIG. 1, the periphery of membrane 15 comprises integral, cut tabs 35 which are untrimed and which have the general configuration shown by the radially extended tabs 35a. When attached, tabs 35 overlap one another as shown in FIG. 1.

Figure 3:
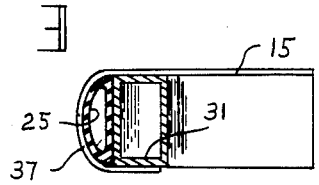
FIG. 3 is an enlarged sectional view taken along line 3—3 of FIG. 1.

In still another embodiment also shown in FIG. 1 a connective woven material 37, suitable for outdoor exposure, is attached to the periphery of membrane 15 by bonding with an epoxy or other suitable high strength adhesive; or by sewing with a high strength thread. This embodiment uses an ultraviolet stablized polypropylene, however glass cloth, rayons and other high strength fabrics may be used. The strands of material 37 are arranged in a bias pattern which is symetrical with respect to the radial direction at all locations around the heliostat 11. This orientation helps ensure that connective material 37 will exhibit uniform radial mechanical properties and allows it to be easily formed to the toroidal like shape of the bladder 21. The normal 45 degree orientation of the fibers and strands of material 37 can be changed to a much steeper angle to the radial direction to reduce circumferential loads and to improve its formability over the toroidal like contour. As FIG. 3 shows, the connective material 37 wraps around bladder wall 25 and is bonded to support frame lower wall 31.

Figure 4:
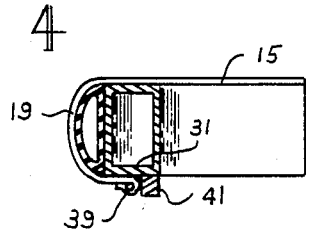
FIG. 4 is an enlarged sectional view showing the use of a load bearing cable.
Figure 5:
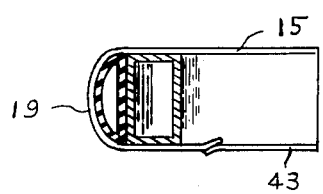
FIG. 5 is an enlarged sectional view showing the use of a rear membrane.

In a further embodiment of the invention shown in FIG. 4, the tabs 19 are attached by bonding or spot welding to a load bearing cable 39 which encircles and lies adjacent the lower support frame wall 31. Connective material 37 may also be used to connect with cable 39 by bonding or sewing. A circumferentially extending series of metal blocks 41, which is fastened to the lower frame wall 31 by welding or by conventional fastening means, serves to locate the cable 39. FIG. 5 shows an embodiment of the invention in which tabs 19 are attached to a lower membrane 43. Tabs 35 or connective material 37 may also be utilized to connect the lower membrane 43.

In the operation of the invention as shown in FIG. 1 the bladder 21 is pressurized to expand and exert compressive forces on frame outer wall 27 and to exert outward force on tabs 13 or 35, or on the connective material 37. The pressure load can be imposed either pneumatically or hydraulically, however in order to minimize weight a pneumatic system is preferred. By regulating the amount of pressure the desired membrane tensioning is achieved. The use of tabs 13 or 35 or the connective material 37 solve the problem of how to avoid the tendency for hoop tension reactions to build up in the curved peripheral region. For example if the membrane is somehow uniformly formed to the compound curved peripheral shape by molding or heat forming a plastic material, or by rolling or drawing a metallic sheet, there would develop a direct hoop tension load path when bladder pressurization occurs. The invention embodiments using tabs 19 or 35 or material 37 circumvent this problem since these features carry primarily tension loads in a radial direction. The use of a pressured bladder tends to maintain the membrane tension even though there may be some material creep or thermal expansion which for a rigid structural system would quickly relieve the membrane tension. In addition, with the instant invention the membrane tension can be readily and easily changed and controlled by adjusting bladder pressure.

Figure 6:
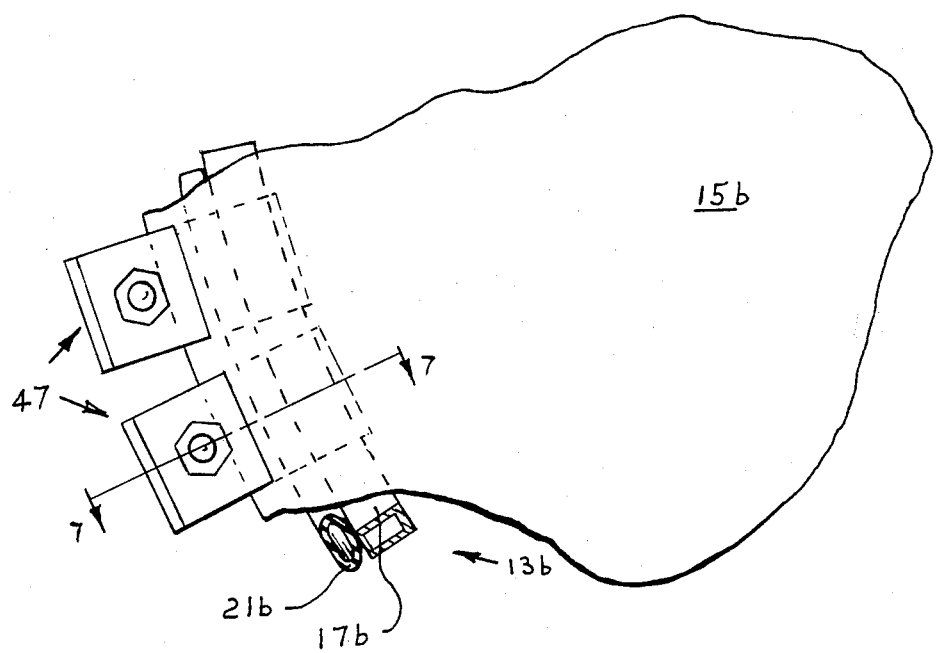
FIG. 6 is a partially broken plan view of a portion of a modification of the invention using clamps.
Figure 7:
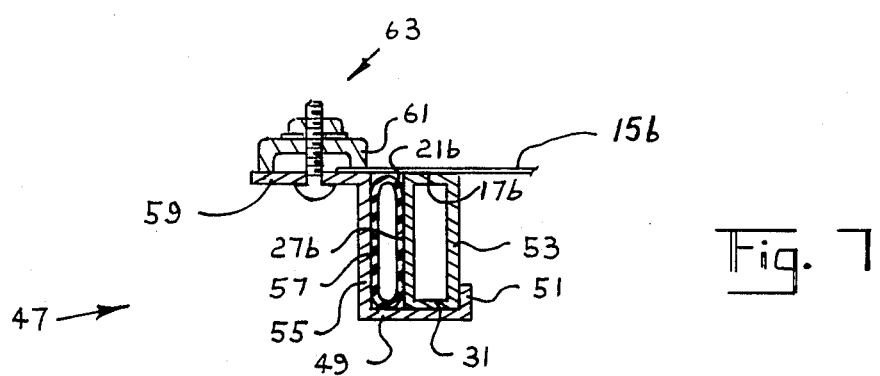
FIG. 7 is an enlarged sectional view taken along line 7—7 of FIG. 6.

FIGS. 6 and 7 are views of a modification of the invention which is most useful as a manufacturing aid for attaching a tensioned membrane to a support frame. FIG. 6 shows a circular membrane 15b engaging the upper surface 17b of circular support frame 13b. An outermost peripheral portion of membrane 15b extends beyond the support frame outer wall 27b for a distance as shown in FIG. 7. A plurality of clamps 47 circumvent the frame 17b as shown in FIG. 6. Each clamp 47 has a lower leg 49 that lies adjacent lower frame wall 31 and which has a toe portion 51 that engages the lower part of frame wall 53. There is a vertically extending member 55 that has an inner surface 57 which is spaced apart from frame outer wall 27b to define a space for location of bladder 21b. Upper arm 59 has an upper surface which lies in the same general plane as the frame upper surface 17b. Jaw 61 is attached to arm 59 by bolt assembly 63. In the operation of aforedescribed fixture a suitable bonding medium is applied along the upper frame surface 17b and a peripheral portion of membrane 15b is received in the space between jaw 61 and upper arm 59. Bolt assembly 63 is then tightened to secure membrane 15b. Bladder 21b is then pneumatically pressurized to exert compressive forces on frame 13b and to pivot the upper portion of clamp 47 outwardly so as to tension the membrane 15b. Bladder pressure is maintained until bonding of membrane 15b to frame surface 17b is effected. In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

What is claimed is:
1. Apparatus for tensioning a membrane, comprising:
   (a) a support frame having a closed loop plan configuration, an outer peripheral surface and a coplanar upper surface,
   (b) a bladder engaging and extending around said outer peripheral frame surface and adapted for receiving a pressurizing fluid, and
   (c) a membrane of a sheet material that is generally coplanar and extending across the opening defined by the loop of said frame and having its lower peripheral surface in engagement with said frame upper surface, the membrane periphery having means connected to it for passing around and embracing the outer surface of said bladder and affixed to a load bearing member in the region of the lower edge of said frame, whereby when said bladder is pressurized said connecting means is pushed radially outwardly and radial tensioning forces are induced in said membrane and radially compressive force is induced in said frame.
2. Apparatus as defined in claim 1 wherein said load bearing member is the lower portion of said frame.

3. Apparatus as defined in claim 1 wherein said load bearing member is a flexible cable.

4. Apparatus as defined in claim 1 wherein said load bearing member is a second, lower membrane.

5. Apparatus as defined in claim 1 wherein said frame has a circular planform.

6. Apparatus as defined in claim 1 wherein said connecting and embracing means comprises a woven material having strands that are arranged in a bias pattern which is symetrical with respect to a direction outward and perpendicular to said frame, at all locations along said frame.

7. Apparatus for tensioning a membrane and holding the tensioned membrane over a support frame for attachment to the support frame, comprising:
(a) a support frame having a closed loop plan configuration, a generally flat outer peripheral surface and a coplanar upper surface,
(b) a bladder engaging and extending around said outer support frame peripheral surface and adapted for receiving a pressurizing fluid,
(c) a peripherally extending plurality of clamps located around the periphery of said frame, said clamps lying adjacent one another and each clamp having an upper portion adapted to receive and clamp the periphery of the membrane, an intermediate portion that extends downwardly adjacent the outer wall of said bladder and a lower portion that pivotally engages the lower portion of said frame, whereby, when the membrane is clamped, pressurization of said bladder urges said clamp upper portion outwardly to tension the membrane while generating compressive forces on said frame.

8. Apparatus as defined in claim 7 wherein the planform of said support frame is circular.

9. Apparatus for tensioning a membrane, comprising:
(a) a support frame having a closed loop plan configuration, an outer peripheral surface and a coplanar upper surface,
(b) a bladder engaging and extending around said outer peripheral frame surface and adapted for receiving a pressurizing fluid, and
(c) a membrane having its lower peripheral surface in engagement with said frame upper surface, the membrane periphery having a peripherally extending series of tabs, integral with said membrane, said tabs passing around and embracing the outer surface of said bladder and affixed to the lower portion of said frame, whereby when said bladder is pressurized said connecting means is pushed radially outwardly and radial tensioning forces are induced in said membrane and radially compressive force is induced in said frame.

10. Apparatus for tensioning a membrane, comprising:
(a) a support frame having a closed loop plan configuration, an outer peripheral surface and a coplanar upper surface,
(b) a bladder engaging and extending around said outer peripheral frame surface and adapted for receiving a pressurizing fluid, and
(c) a membrane having its lower peripheral surface in engagement with said frame upper surface, the membrane periphery having a peripherally extending series of tabs, integral with said membrane, said tabs passing around and embracing the outer surface of said bladder and affixed to a flexible cable in the region of the lower edge of said frame, whereby when said bladder is pressurized said connecting means is pushed radially outwardly and radial tensioning forces are induced in said membrane and radially compressive force is induced in said frame.

11. Apparatus for tensioning a membrane, comprising:
(a) a support frame having a closed loop plan configuration, an outer peripheral surface and a coplanar upper surface,
(b) a bladder engaging and extending around said outer peripheral frame surface and adapted for receiving a pressurizing fluid, and
(c) a first membrane having its lower peripheral surface in engagement with said frame upper surface, the membrane periphery having a peripherally extending series of tabs, integral with said membrane, said tabs passing around and embracing the outer surface of said bladder and affixed to a second, lower membrane engaging the lower edge of said frame, whereby when said bladder is pressurized said connecting means is pushed radially outwardly and radial tensioning forces are induced in said first and second membranes and radially compressive force is induced in said frame.

* * * * *